US012565273B2

(12) United States Patent     (10) Patent No.:   US 12,565,273 B2

Nemer et al.     (45) Date of Patent:    Mar. 3, 2026

---

(54) CHARGE PORT SHIELD AND SHIELDING METHOD

(71) Applicant: Ford Global Technologies, LLC, Dearborn, MI (US)

(72) Inventors: Nemer Nemer, Dearborn, MI (US); Patrick J. Reed, Livonia, MI (US); Martin D. Lopez, Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 359 days.

(21) Appl. No.: 18/332,804

(22) Filed: Jun. 12, 2023

(65) Prior Publication Data

US 2024/0409164 A1     Dec. 12, 2024

(51) Int. Cl.
    *B62D 25/24*       (2006.01)
    *B60L 53/16*       (2019.01)
    *H01R 13/447*     (2006.01)

(52) U.S. Cl.
    CPC .............. *B62D 25/24* (2013.01); *B60L 53/16* (2019.02); *H01R 13/447* (2013.01); *H01R 2201/26* (2013.01)

(58) Field of Classification Search
    CPC ....... B62D 25/24; B60L 53/16; H01R 13/447; H01R 2201/26; H01R 13/52
    See application file for complete search history.

(56) References Cited

U.S. PATENT DOCUMENTS

| | | | | |
|---|---|---|---|---|
| 6,638,083 | B2 * | 10/2003 | Rhude ................... | H01R 13/60 |
| | | | | 439/35 |
| 9,597,968 | B2 * | 3/2017 | Schoener ........... | H01R 13/5219 |
| D897,931 | S * | 10/2020 | Guo ............................ | D12/402 |

FOREIGN PATENT DOCUMENTS

| | | |
|---|---|---|
| CN | 108657002 A | 10/2018 |
| CN | 216580140 U | 5/2022 |
| DE | 102018122681 A1 | 3/2020 |

\* cited by examiner

*Primary Examiner* — Briggitte R. Hammond
(74) *Attorney, Agent, or Firm* — David B. Kelley; Carlson, Gaksey & Olds, P.C.

(57)       ABSTRACT

An assembly includes a charge port shield that couples to a charge port through an interference fit. The charge port shield includes a plug access opening to permit connecting a charger plug to the charge port. A ledge of the charge port shield can project outboard over the plug access opening to shield the charge port.

20 Claims, 3 Drawing Sheets

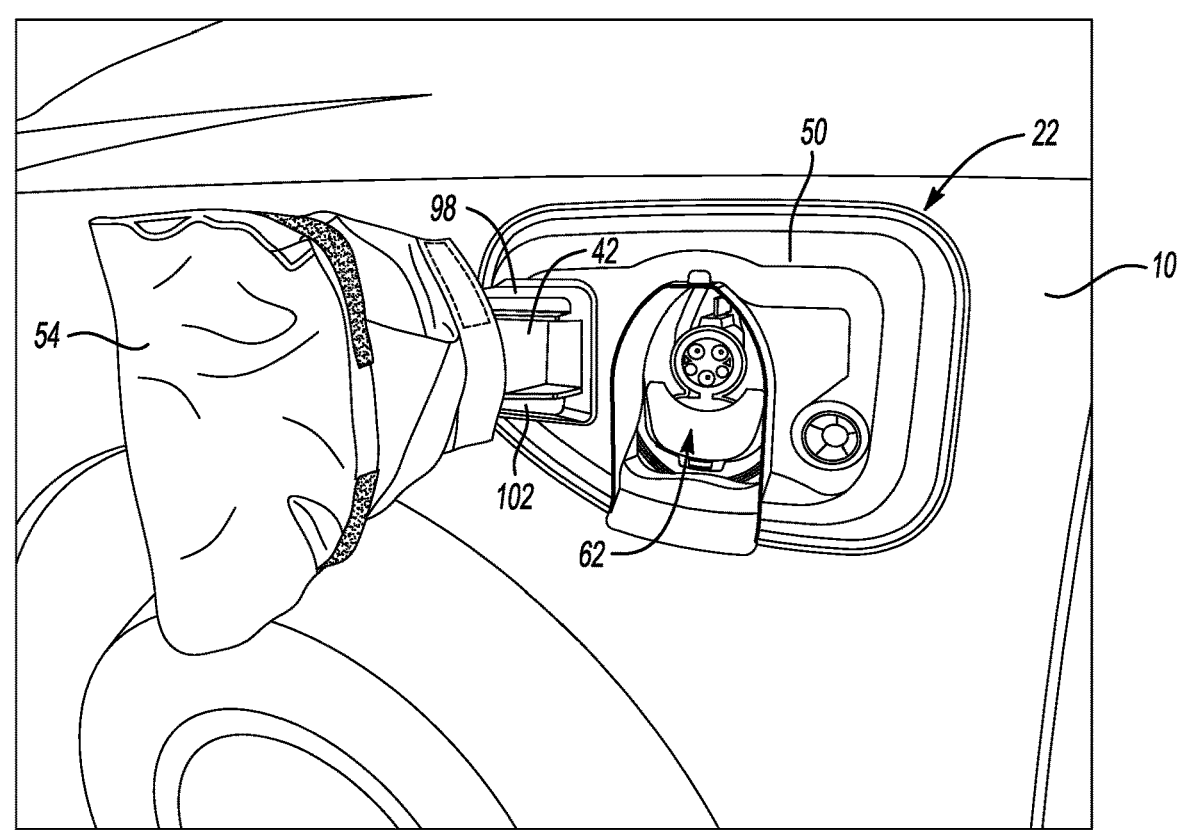
_Fig-3_
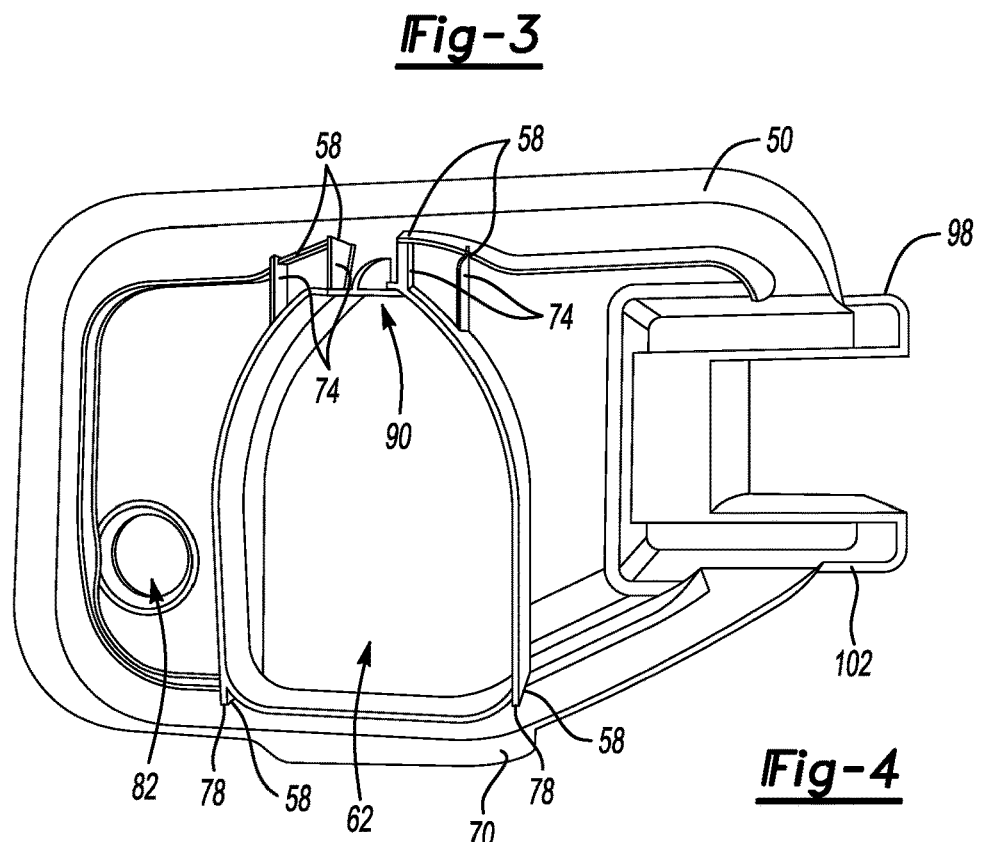
_Fig-4_

CHARGE PORT SHIELD AND SHIELDING METHOD

TECHNICAL FIELD

This disclosure relates generally to shielding a charge port of an electrified vehicle from environmental precipitation, such as a rain and snow, and contaminants.

BACKGROUND

Electrified vehicles differ from conventional motor vehicles because electrified vehicles are selectively driven by one or more electric machines powered by a traction battery pack. The electric machines can propel the electrified vehicles instead of, or in combination with, an internal combustion engine. Some electrified vehicles, such as plug-in hybrid electric vehicles (PHEVs) and battery electric vehicles (BEVs), include a charge port. A plug of electric vehicle supply equipment (EVSE) assembly can connect to the charge port when charging the traction battery pack.

SUMMARY

In some aspects, the techniques described herein relate to an assembly, including: a charge port shield that couples to a charge port through an interference fit, the charge port shield including a plug access opening to permit connecting a charger plug to the charge port.

In some aspects, the techniques described herein relate to an assembly, further including a ledge of the charge port shield, the ledge projecting outboard over the plug access opening to shield the charge port.

In some aspects, the techniques described herein relate to an assembly, further including a pull tab of the charge port shield, the pull tab configured to be grasped and pulled to decouple the charge port shield from the charge port.

In some aspects, the techniques described herein relate to an assembly, wherein the ledge is vertically above the plug access opening and the pull tab is vertically below the plug access opening.

In some aspects, the techniques described herein relate to an assembly, further including at least one rib extending from the charge port shield on an opposite side of the charge port shield from the ledge, the at least one rib compressed by a portion of the charge port to provide the interference fit.

In some aspects, the techniques described herein relate to an assembly, wherein the at least one rib includes at least one upper rib that is disposed above the plug access opening, and at least on lower rib that is disposed below the plug access opening.

In some aspects, the techniques described herein relate to an assembly, wherein the charge port shield includes a polymer-based material that includes a ultraviolet stabilizing additive.

In some aspects, the techniques described herein relate to an assembly, wherein the charge port shield includes a release button access opening to provide access to a release button of the charge port.

In some aspects, the techniques described herein relate to an assembly, wherein the charge port shield includes an illumination opening to permit light from a light of the charge port to move through the charge port shield.

In some aspects, the techniques described herein relate to an assembly, further including an upper arm and a lower arm of the charge port shield, the upper arm and the lower arm configured to sandwich a charge port door hinge arm when the charge port shield is coupled to the charge port.

In some aspects, the techniques described herein relate to an assembly, further including a charge port door cover, the charge port door cover configured to receive the charge port shield to store the charge port shield when the charge port shield is not coupled to the charge port, the charge port door cover configured to receive a charge port door when the charge port shield is coupled to the charge port.

In some aspects, the techniques described herein relate to an assembly, wherein the charge port shield is detached from the charger plug when the charge port shield is coupled to the charge port and the charger plug is engaged with the charge port.

In some aspects, the techniques described herein relate to a charge port shielding method, including: coupling a charge port shield to a charge port using an interference fit; and connecting a charger plug to the charge port through an opening in the charge port shield.

In some aspects, the techniques described herein relate to a charge port shielding method, further including compressing at least one rib of the charge port shield during the coupling.

In some aspects, the techniques described herein relate to a charge port shielding method, further including receiving a charge port door hinge between a pair of arms of the charge port shield during the coupling.

In some aspects, the techniques described herein relate to a charge port shielding method, further including coupling the charge port shield without using magnets or mechanical fasteners.

In some aspects, the techniques described herein relate to a charge port shielding method, further including covering a charge port door with a charge port door cover.

In some aspects, the techniques described herein relate to a charge port shielding method. wherein the charge port door cover is a bag.

In some aspects, the techniques described herein relate to a charge port shielding method, further including storing the charge port shield within the charge port door cover after the coupling.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 illustrates the charge port shield of FIG. 2 coupled to the charge port of FIG. 2 via an interference fit and additionally illustrates the storage bag providing a charge port door cover.

FIG. 4 illustrates a rear view of the charge port shield of FIG. 2.

DETAILED DESCRIPTION

This disclosure relates generally to a charge port shield and a method for utilizing the charge port shield. A user can couple the charge port shield to a charge port to shield the charge port from precipitation, such as rain and snow, and debris.

Figure 1:
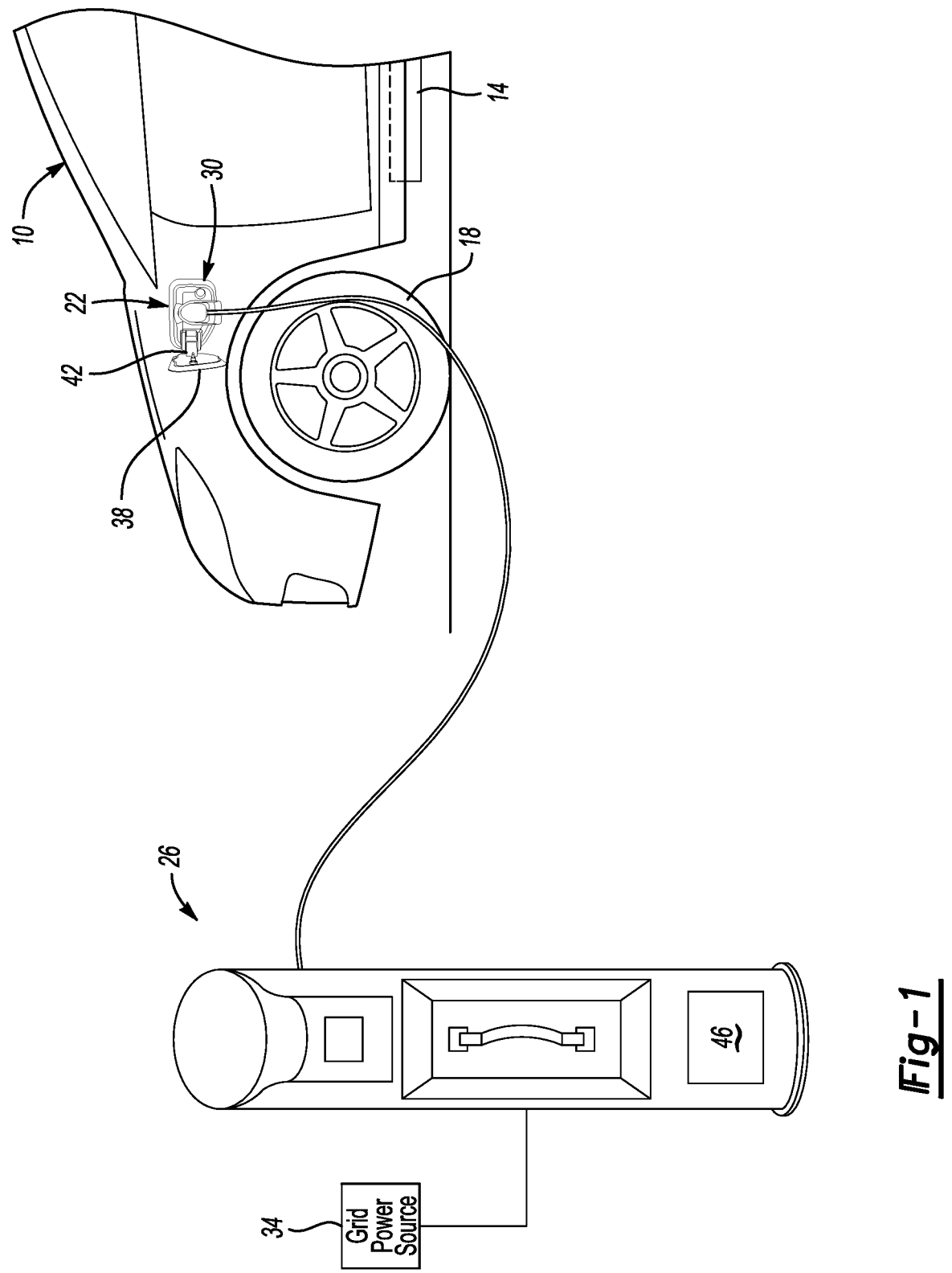
FIG. 1 illustrates an exemplary vehicle charging from an external power source.

With reference to FIG. 1, an exemplary electrified vehicle 10 includes a battery pack 14, which may be a traction battery pack. The vehicle 10 may include any electrified powertrain capable of applying torque from an electric machine for driving drive wheels 18 of the vehicle 10.

In an embodiment, the vehicle 10 is an all-electric, such as a battery electric vehicle (BEV). In another example, the vehicle could be a plug-in hybrid electric vehicle (PHEV). In a PHEV, the powertrain can electrically propel the drive wheels 18 with or without the assistance of an internal combustion engine.

The example vehicle 10 is a sedan. However, the teachings of this disclosure are applicable to other vehicle types, such as, for example, cars, pickup trucks, vans, SUVs, etc.

Although shown schematically, the battery pack 14 can be a hybrid traction battery pack that includes a plurality of battery arrays (i.e., battery assemblies or groupings of battery cells) capable of outputting electrical power to one or more electrical machines of the vehicle 10. Other types of energy storage devices and output devices can also be used to electrically power the vehicle 10.

From time to time, charging the battery pack 14 from an external power source may be desired. The vehicle 10 thus includes a charge port 22. Electric vehicle supply equipment (EVSE) 26 can include a charger plug 30 that connects to the charge port 22 to operably couple the EVSE 26 to the charge port 22. When the EVSE 26 is operably coupled to the charge port 22, a grid power source 34 can provide power to the vehicle 10 through the charge port 22 to charge the battery pack 14.

The grid power source 34 is, in this example, a utility grid power source. Other external power sources are contemplated and fall within the scope of this disclosure including, for example, solar power, wind power, etc. In yet another embodiment, the grid power source 34 could be replaced with a combined grid and alternative energy source of power to recharge the battery pack 14 of the vehicle 10. The EVSE 26 can be located at a home of a user, at a public charging station, etc.

In some examples, the charger plug 30 connects to the charge port 22 to deliver DC power to the vehicle 10. In another example, AC power could be delivered through the charger plug 30 to the charge port 22. The charge port 22 in this example can selectively receive DC or AC.

When charging the vehicle 10 through the charge port 22 is not desired, a charge port door 38 can be moved to a closed position from the open position shown. In the closed position, the charge port door 38 covers the charge port 22. The charge port door 38 is pivotably coupled relative to the charge port 22 via a charge port door hinge 42.

As can be appreciated, particularly when the charge port door 38 is in the open position, precipitation, such as snow and ice, can collect on areas of the charge port 22. If the charger plug 30 is not coupled to the charge port 22, accumulated precipitation could interfere with coupling the charger plug 30 to the charge port 22. If the charger plug 30 is coupled to the charge port 22, the precipitation could accumulate on the charger plug 30 and the charge port 22 and interfere with decoupling the charger plug 30 from the charge port 22.

Figure 2:
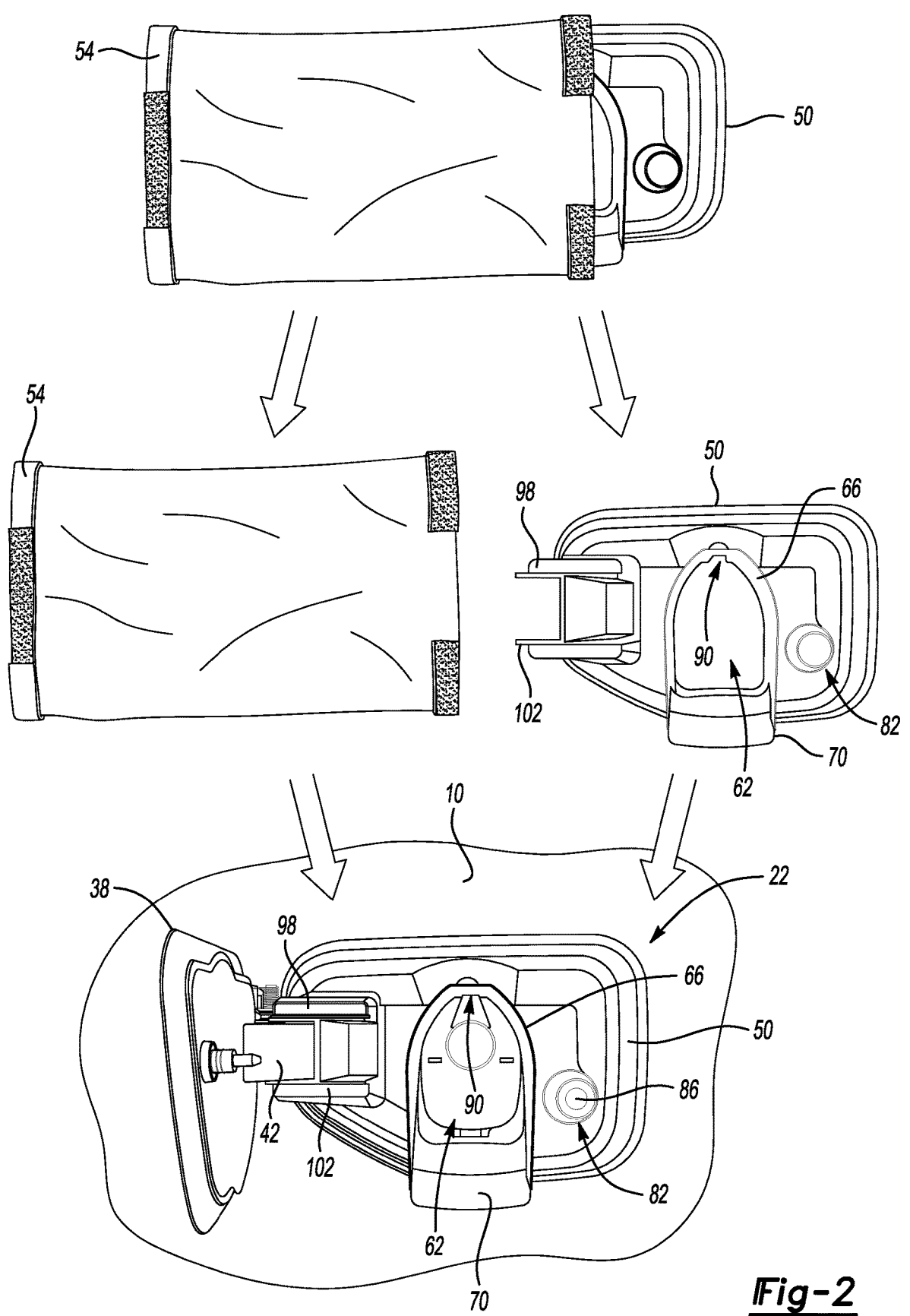
FIG. 2 illustrates removing a charge port shield from a storage bag to prepare for coupling the charge port shield to a charge port from the vehicle of FIG. 1.

With reference to FIGS. 2 and 3, a user can use a charge port shield 50 to shield areas of the charge port 22 from environmental precipitation and debris. The charge port shield 50, in particular, shields areas of the charge port 22 wherein the charger plug 30 connects to the charge port 22.

The example charge port shield 50 can be stored in a charge port shield bag 54 when not in use. The bag 54 along with the charge port shield 50 can be stowed within a glove box of the vehicle 10, for example. The bag 54 can be a polyvinyl chloride (PVC) and polyethylene terephthalate (PET) denim print final bag. Hook and loop fasteners can be used to secure the charge port shield 50 within the bag 54.

When shielding the charge port 22 with the charge port shield 50 is desired, the charge port shield 50 can be withdrawn from the bag 54. After removing the charge port shield 50 from the bag 54, the charge port shield 50 can then be coupled to the charge port 22 through an interference fit.

As the charge port 22 can be coupled to the charge port 22 through, among other things, an interference fit, magnets are not required to couple the example charge port shield 50 to the charge port 22, nor are mechanical fasteners required. The charge port 22 can thus be coupled to the charge port 22 even if the charge port 22 does not include magnetic materials. In the past, magnetic devices have been used to cover areas of charge ports.

As to the interference fit, as shown in FIG. 4, a back side of the charge port shield 50 includes a plurality of ribs 58. When the charge port shield 50 is coupled to the charge port 22, the ribs 58 are slightly compressed which holds the charge port shield 50 relative to the charge port 22.

The charge port shield 50 is, in the exemplary embodiment, a polymer-based material that can include an ultraviolet stabilizing additive. The charge port shield 50 can be considered a rubber-like material, which facilitates the interference fit between the charge port shield 50 and the charge port 22.

The charge port shield 50 includes a plug access opening 62. When the charge port shield 50 is coupled to the charge port 22, the charger plug 30 can be connected and disconnected from the charge port 22 through the plug access opening 62. The plug access opening 62 thus permits connecting of the charger plug 30 without decoupling the charge port shield 50 from the charge port 22.

When the charge port shield 50 is coupled to the charge port 22, the charger plug 30 can engage and disengage the charge port 22 without contacting the charge port shield 50. The charge port shield 50 is completely detached from the charger plug 30 in this example.

The charge port shield 50 includes a ledge 66 that, when the charge port shield 50 is coupled to the charge port 22, projects outboard from the vehicle 10 over the plug access opening 62. The ledge 66 conceals areas of the charge port 22, particularly areas engaged by the charger plug 30 when connecting the charger plug 30 to the charge port 22. In other words, should snow fall when charging the vehicle 10 through the charge port 22, the snow can be redirected by the ledge 66 or builds up on the ledge 66 rather than falling and building up on the charger plug 30, the charge port 22, or both.

The ledge 66 is arc shaped in this example. The ledge 66 over a vertical top of the plug access opening 62 and has legs extending along opposing sides of the plug access opening 62.

Beneath the plug access opening 62, the charge port shield 50 includes is a pull tab 70. In this example, the pull tab 70 spans and connects to the legs of ledge 66. A user can grasp and pull the pull tab 70 to decouple the charge port shield 50 from the charge port 22. In this example, the ledge 66 is substantially vertically above the plug access opening 62 whereas the pull tab 70 is vertically below the plug access opening 62.

Referring again to the ribs 58, the ribs 58 extend from a back side of the charge port shield 50, which is on an opposite of the charge port shield 50 from the ledge 66 and the pull tab 70. The ribs 58 include at least one upper rib 74 that is disposed vertically above the access opening 62 when the charge port shield 50 is coupled to the charge port 22 and at least one lower rib 78 that is disposed vertically beneath the access opening 62 when the charge port shield 50 is coupled to the charge port 22. In this example, there are four upper ribs 74, and two lower ribs 78. Upper and lower, as well as vertical and horizontal, are, for purposes of this disclosure, are with reference to ground and a general orientation of the vehicle 10 and the charge port 22 during operation.

In the exemplary embodiment, the charge port shield 50 additionally includes a release button access opening 82. A release button 86 of the charge port 22 can be accessed through the release button access opening 82 when the charge port shield 50 is coupled to the charge port 22.

In the exemplary embodiment, the charge port shield 50 additionally includes an illumination opening 90, which is vertically above the access opening 62. The illumination opening 90 provides a path for light to move downward from a light of the charge port 22 to illuminate areas of the charge port 22 through the illumination opening 90. Thus, the charge port 22 can remain illuminated even when the charge port shield 50 is coupled to the charge port 22.

The charge port shield 50 additionally includes a pair of arms including an upper arm 98 and a lower arm 102. The upper arm 98 and the lower arm 102 project horizontally from other portions of the charge port shield 50. When the charge port shield 50 is coupled to the charge port 22, the hinge 42 is sandwiched between the upper arm 98 and the lower arm 102. Sandwiching the hinge 42 with the upper arm 98 and the lower arm 102 in this way can help to align and support the charge port shield 50 when coupled to the charge port 22.

In the exemplary embodiment, the bag 54 can be positioned over the charge port door 38 when the charge port shield 50 is coupled to the charge port 22. The hook and loop fasteners of the bag 54 can be used to secure the bag 54 about the charge port door 38. The bag 54 thus provides a charge port door cover.

Positioning the bag 54 over the charge port door 38 can shield the charge port door 38 from precipitation, such as rain and snow. After charging is complete and the user desires to close the charge port door 38, the user can remove the bag 54 to reveal a charge port door 38 free from a buildup of precipitation. After the charge port shield 50 is removed by the user pulling on the pull tab 70, the charge port door 38 can then reliably move to a closed position.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

6

1. An assembly, comprising:
   a charge port shield that couples to a charge port through an interference fit, the charge port shield including a plug access opening to permit connecting a charger plug to the charge port;
   a ledge of the charge port shield, the ledge projecting outboard over the plug access opening to shield the charge port; and
   a pull tab of the charge port shield, the pull tab configured to be grasped and pulled to decouple the charge port shield from the charge port.

2. The assembly of claim 1, wherein the ledge is vertically above the plug access opening and the pull tab is vertically below the plug access opening.

3. An assembly, comprising:
   a charge port shield that couples to a charge port through an interference fit, the charge port shield including a plug access opening to permit connecting a charger plug to the charge port, the interference fit being formed prior to connecting of the charger plug to the charge port.

4. The assembly of claim 3, further comprising a ledge of the charge port shield, the ledge projecting outboard over the plug access opening to shield the charge port.

5. The assembly of claim 4, further comprising at least one rib extending from the charge port shield on an opposite side of the charge port shield from the ledge, the at least one rib compressed by a portion of the charge port to provide the interference fit.

6. The assembly of claim 5, wherein the at least one rib comprises at least one upper rib that is disposed above the plug access opening, and at least on lower rib that is disposed below the plug access opening.

7. The assembly of claim 3, wherein the charge port shield comprises a polymer-based material that includes an ultra-violet stabilizing additive.

8. The assembly of claim 3, wherein the charge port shield includes a release button access opening to provide access to a release button of the charge port.

9. The assembly of claim 3, wherein the charge port shield includes an illumination opening to permit light from a light of the charge port to move through the charge port shield.

10. The assembly of claim 3, further comprising an upper arm and a lower arm of the charge port shield, the upper arm and the lower arm configured to sandwich a charge port door hinge arm when the charge port shield is coupled to the charge port.

11. The assembly of claim 3, further comprising a charge port door cover, the charge port door cover configured to receive the charge port shield to store the charge port shield when the charge port shield is not coupled to the charge port, the charge port door cover configured to receive a charge port door when the charge port shield is coupled to the charge port.

12. The assembly of claim 3, wherein the charge port shield is detached from the charger plug when the charge port shield is coupled to the charge port.

13. A charge port shielding method, comprising:
   coupling a charge port shield to a charge port using an interference fit between the charge port shield and the charge port; and
   after the coupling, connecting a charger plug to the charge port through an opening in the charge port shield.

14. The charge port shielding method of claim 13, further comprising compressing at least one rib of the charge port shield during the coupling.

15. The charge port shielding method of claim 13, further comprising receiving a charge port door hinge between a pair of arms of the charge port shield during the coupling.

16. The charge port shielding method of claim 13, further comprising coupling the charge port shield without using magnets or mechanical fasteners.

17. The charge port shielding method of claim 13, further comprising covering a charge port door with a charge port door cover.

18. The charge port shielding method of claim 17, wherein the charge port door cover is a bag.

19. The charge port shielding method of claim 17, further comprising storing the charge port shield within the charge port door cover after the coupling.

20. The charge port shielding method of claim 17, wherein the interference fit is an interference fit between the charge port shield and the charge port.

* * * * *